US008480885B2

(12) United States Patent
Bryson et al.

(10) Patent No.: US 8,480,885 B2
(45) Date of Patent: Jul. 9, 2013

(54) FULL FLOW LIQUID FILTER WITH INTEGRAL BYPASS FILTRATION

(75) Inventors: Theodore Michael Bryson, Fayetteville, NC (US); L. Steven Cline, Fayetteville, NC (US); Christopher Eichler, Hope Mills, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 389 days.

(21) Appl. No.: 12/467,423

(22) Filed: May 18, 2009

(65) Prior Publication Data
US 2010/0288688 A1    Nov. 18, 2010

(51) Int. Cl.
*B01D 27/10* (2006.01)
*B01D 27/14* (2006.01)

(52) U.S. Cl.
USPC .... 210/130; 210/342; 210/440; 210/DIG. 13; 210/DIG. 17

(58) Field of Classification Search
CPC .................................................... B01D 27/144
USPC ................ 210/130, 132, 254, 256, 315, 348, 210/440, 443, 493.2, DIG. 13, DIG. 17
See application file for complete search history.

(56) References Cited

U.S. PATENT DOCUMENTS

| | | | | |
|---|---|---|---|---|
| 3,297,162 | A | * | 1/1967 | Mouwen ........................ 210/132 |
| 3,420,377 | A | * | 1/1969 | Vandersip ...................... 210/315 |
| 3,467,256 | A | * | 9/1969 | Humbert, Jr. et al. ........ 210/132 |
| 3,524,552 | A | * | 8/1970 | Carmon ......................... 210/342 |
| 4,253,954 | A | * | 3/1981 | Midkiff et al. ................ 210/315 |
| 5,447,627 | A | | 9/1995 | Loafman et al. |
| 5,738,172 | A | | 4/1998 | van Mook et al. |
| 6,068,762 | A | * | 5/2000 | Stone et al. ...................... 210/90 |
| 6,319,402 | B1 | | 11/2001 | Schwandt et al. |
| 6,350,379 | B1 | | 2/2002 | Roll et al. |
| 6,666,968 | B2 | | 12/2003 | Smith et al. |
| 6,787,033 | B2 | | 9/2004 | Beard et al. |
| 7,014,761 | B2 | | 3/2006 | Merritt et al. |
| 7,090,773 | B2 | | 8/2006 | Meddock et al. |
| 7,708,147 | B2 | * | 5/2010 | Attassery et al. ........ 210/433.1 |
| 2005/0252838 | A1 | | 11/2005 | Fisher |
| 2006/0226065 | A1 | | 10/2006 | Meddock et al. |
| 2008/0078716 | A1 | | 4/2008 | Farmer |
| 2008/0087590 | A1 | | 4/2008 | Jergens |

OTHER PUBLICATIONS

Corresponding International Search Report dated Jul. 8, 2010.
PCT Notification Concerning Transmittal of International Preliminary Report on Patentability, Dec. 1, 2011, (1 Page) with attached International Report on Patentability (1 Page) and attached Form PCT/ISA/237 (5 Pages).

* cited by examiner

*Primary Examiner* — Terry Cecil
(74) *Attorney, Agent, or Firm* — Crowell & Moring LLP

(57) ABSTRACT

A fluid filter has an outer case with a side wall, a closed first end wall, and a second end wall defining fluid inlet and outlet openings, as well as a filter cartridge received within the outer case. The filter cartridge includes a substantially cylindrical full flow filter element, providing for passage of a major portion of fluid entering the filter, and a substantially cylindrical bypass filter element, providing for passage of a minor portion of fluid entering the filter and disposed radially within and surrounded circumferentially by the full flow filter element. By way of the particular fluid filter configuration disclosed, a simple alternative to known filters having full flow and bypass filters located in common housings is provided.

9 Claims, 2 Drawing Sheets

FULL FLOW LIQUID FILTER WITH INTEGRAL BYPASS FILTRATION

BACKGROUND OF THE INVENTION

1. Field of the Invention

A simple alternative to known filters having full flow and bypass filters located in common housings is described and claimed.

2. Description of Related Art

Known filter systems for automotive or other applications commonly utilize one of two full flow filter and bypass filter configurations. One such configuration is an arrangement having two separate filtering systems, with a full flow system, which may include more than one filter, depending on flow requirements, and a bypass filter system, which processes only a small percentage of the full fluid volume. In such a configuration, an in-line, series approach is often utilized, with a full flow filter provided downstream of a bypass filter. These systems typically introduce additional costs and components for the automotive assembler and service industry to handle and manage. Vehicle weight is increased as well. U.S. Patent application publication 2008/0078716 to Farmer discloses one such in-line, series approach to filtering.

Evolutions of this configuration include systems having filters with full flow and bypass media stacked upon each other in the same filter housing. Examples of filters having stacked media include apparatuses disclosed by U.S. Patent application publication 2005/0252838 to Fisher and U.S. Pat. No. 5,447,627 to Loafman et al., U.S. Pat. No. 6,319,402 to Schwandt et al., and U.S. Pat. No. 6,350,379 to Roll et al. These sorts of arrangements, however, can reduce the overall capacity for the full flow and bypass filter media.

Further developments have provided increased filtering capacity in the same or smaller footprint, while also offering high efficiency bypass filtration to "polish" the fluid system and provide integral soot filtration, by fitting bypass filters concentrically within full flow filters. U.S. Pat. No. 6,666,968 to Smith et al., U.S. Pat. No. 6,787,033 to Beard et al., U.S. Pat. No. 7,014,761 to Merritt et al., and U.S. Pat. No. 7,090,773 to Meddock et al. provide examples of such developments. The disclosure of each of these U.S. patents is incorporated herein by reference in its entirety as non-essential subject matter.

SUMMARY OF THE INVENTION

The present invention provides a simple alternative to known filters having full flow and bypass filters located in common housings. According to the invention, a fluid filter includes an outer case with a side wall, a closed first end wall, and a second end wall defining fluid inlet and outlet openings, and a filter cartridge received within the outer case. The filter cartridge includes a substantially cylindrical full flow filter element, providing for passage of a major portion of fluid entering the filter, and a substantially cylindrical bypass filter element, providing for passage of a minor portion of fluid entering the filter and disposed radially within and surrounded circumferentially by the full flow filter element.

Also included as parts of the cartridge are a first annular end cap, which has a first solid wall to which adjacent first ends of both the full flow filter element and the bypass filter element are secured and which surrounds an inlet to an inner bypass filter volume, and a second annular end cap, including a second solid wall adapted to surround a filter discharge opening. A second end of the full flow filter element is secured to the second solid wall.

The cartridge further includes a bypass filter end cap, disposed at an intermediate location between the first and second annular end caps, to which a second end of the bypass filter element is secured. The bypass filter end cap may be formed by either a solid disc closing off the second end of the bypass filter element or by a cap structure permitting one way fluid flow therethrough for pressure relief. By way of the fluid filter configuration claimed, fluid flow into the bypass filter volume occurs through a space defined between the closed first end wall of the outer case and the first annular end cap, and through the inlet to the inner bypass filter volume surrounded by the first annular end cap.

In the illustrated fluid filter configuration, the first annular end cap includes radially inner and outer flanges depending from the first solid wall to facilitate positioning of the full flow and bypass filter elements. The second annular end cap includes a radially outer flange depending from the second solid wall to facilitate positioning of the full flow filter element.

A spacer acts between the solid wall of the first annular end cap and the closed end wall of the outer case.

Finally, the filter may be provided with a perforated support tube located around a surface of at least one of the full flow and bypass filter elements. In the particular embodiment of the invention illustrated, that surface can be a circumferential outer or a circumferential inner surface.

A design according to the present invention, in a simplified manner, incorporates maximized full flow and bypass media surface areas while housing the bypass medium within an area that is commonly located downstream of the full flow medium. Media for both full flow and bypass flow are bonded or otherwise secured to a common, open end cap, and both media are supported by center tubes to resist crushing of the elements in cold weather startup conditions. The bypass medium is bonded to either a closed end cap or an end cap incorporating a conventional relief valve to allow flow to bypass both filters if they are clogged up or if the system is over-pressurized due to pressure regulator failure or cold temperature start up.

The customer will receive a price benefit resulting from the provision of a less complex system and elimination of extra material from the filtering system. Reduction of required storage space also results from reduced inventories of multiple filters conventionally needed with separate in-line media configurations.

DETAILED DESCRIPTION OF THE INVENTION

Figure 1:
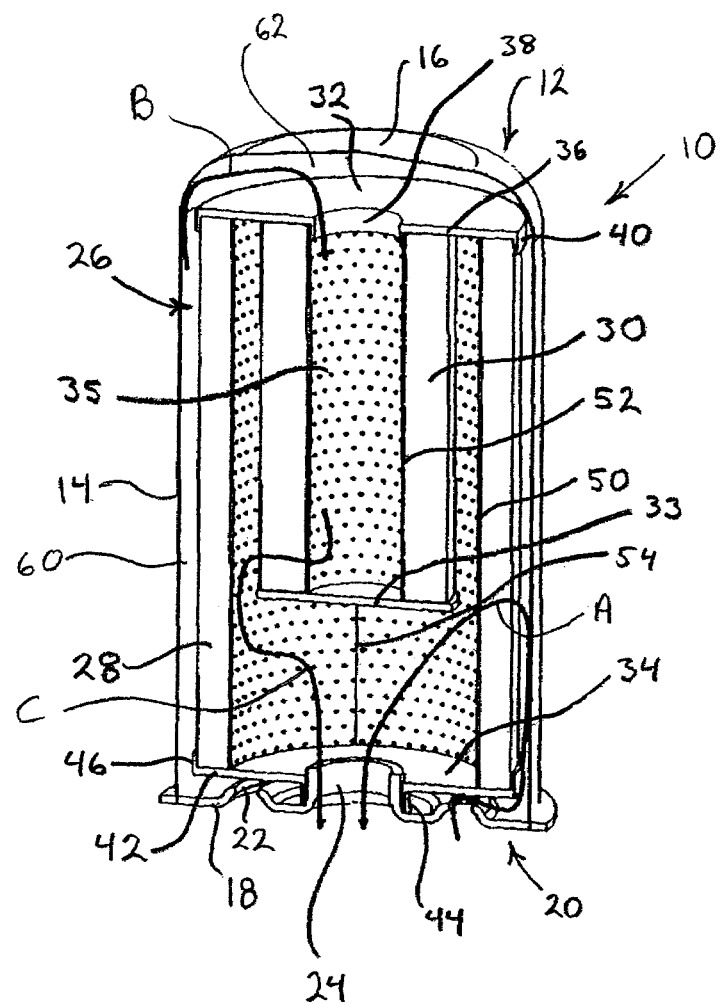
FIG. 1 is a schematic, cut away perspective view of a fluid filter showing flow paths according to the present invention.

The liquid filter 10 shown in FIG. 1 includes an outer case 12 composed of an approximately cylindrical side wall 14, a top formed by an end wall 16, and an annular end wall 18 forming part of a bottom assembly 20. The terms "fluid," "liquid," and "oil" will be used interchangeably throughout this description, but it should be understood that it is possible to use the filter 10 of the invention in connection with fluids or liquids other than oil when desired. The annular wall 18 is provided with an oil filter discharge opening 24 as well as a hole, slot, perforation, or other such opening 22, or a plurality of holes, slots, perforations, or other such openings, circumferentially surrounding the discharge opening. The discharge opening 24 is typically threaded for connection to a correspondingly threaded fitting attached to or forming part of a vehicle engine, so that oil leaving the filter 10 through the discharge opening enters the engine oil circulating system.

A filter cartridge 26 disposed within the outer case 12 is composed of a substantially cylindrical full flow filter element 28, a substantially cylindrical bypass filter element 30 surrounded circumferentially by the full flow filter element, a first, annular, top end cap 32, a second, annular, bottom end cap 34, and a bypass filter end cap 33. The first end cap 32 shown in FIG. 1 is formed by a solid, substantially flat wall 36 having a radially inner flange 38 and a radially outer flange 40 depending from that flat wall. The flanges 38 and 40 are shown as oriented in the same direction, and, in combination with the solid wall 36, act to provide the first end cap 32 with an approximately "C" or "U" shaped cross-section. Adjacent first ends of both the full flow filter element 28 and the bypass filter element 30 are bonded or otherwise secured to the flat wall 36 of the first end cap 32. The flanges 38 and 40 facilitate initial positioning of the bypass and full flow filter elements 30 and 28, respectively, with respect to the end cap 32.

The second end cap 34 of the filter cartridge 26, as shown, is formed by a solid, substantially flat wall 42 having both a radially inner flange 44 and a radially outer flange 46 depending from that flat wall. The flanges 44 and 46 shown are oriented in opposite directions, and, in combination with the solid wall 42, act to provide the bottom end cap 34 with an approximately "Z" shaped cross-section. The flange 46 facilitates initial positioning of the full flow filter element 28 on the second end cap 34. The flange 44 acts as a spacer between the solid wall 42 and the annular end wall 18 of the outer case, and assures that a clearance between the openings 22 and the solid wall 42 is maintained so as to permit fluid to flow in a way to be described. The spacer could alternatively be formed as part of the end wall 18 of the bottom assembly 20 rather than as part of the bottom end cap 34 of the filter cartridge. In this case, the second end cap 34 would have an approximately "L" shaped cross-section. A second end of the full flow filter element 28 is bonded or otherwise secured to the solid wall 42.

Figure 2:
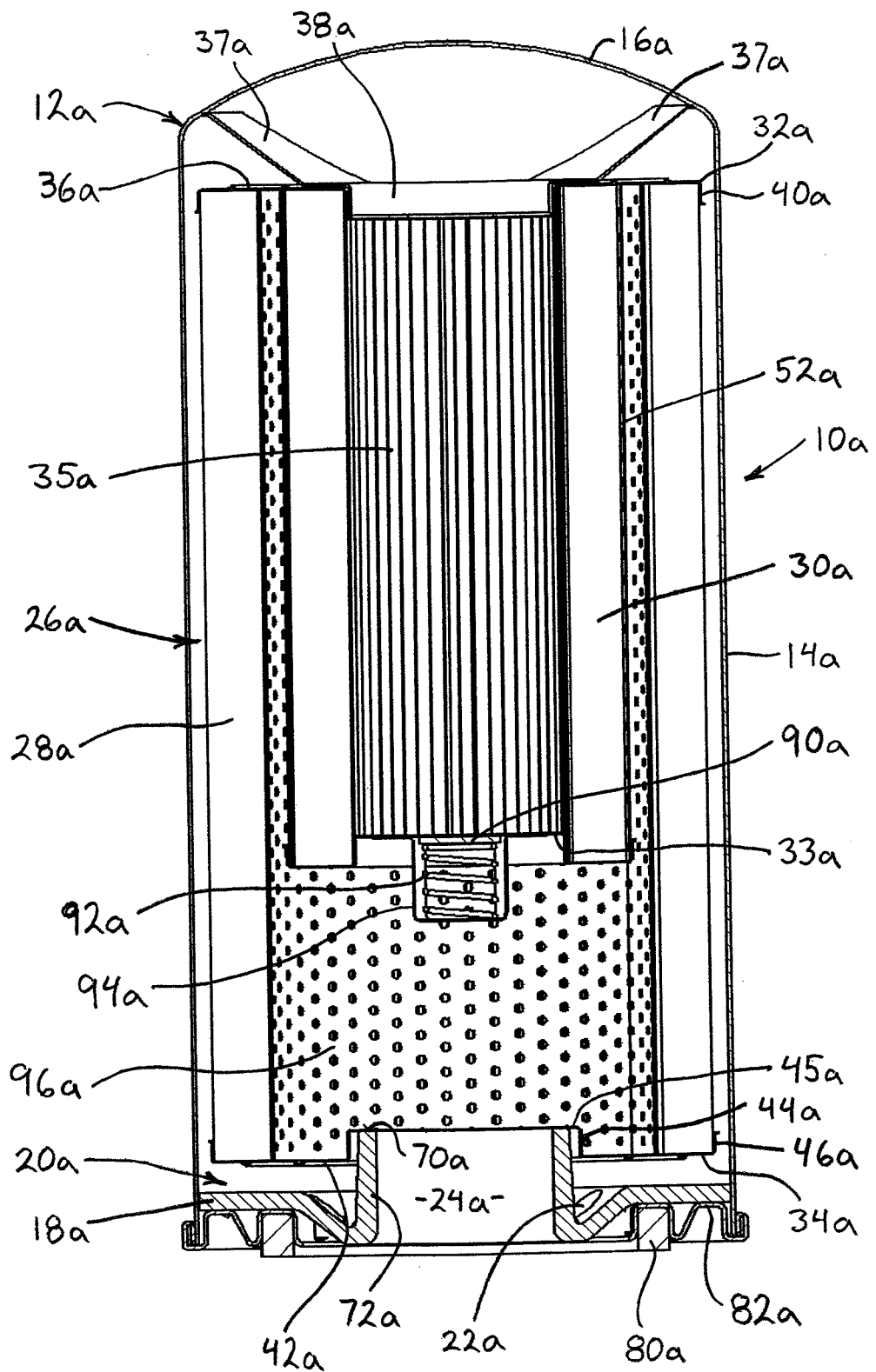
FIG. 2 is a more detailed, side sectional view of a fluid filter according to the present invention.

The bypass filter end cap 33, shown in FIG. 1 in its simplest configuration, can be formed by a solid disc, bonded or otherwise secured to a second end of the bypass filter element 30 and closing off an end of the inner bypass filter volume 35 as illustrated. In a preferred embodiment, the end cap 33 may have a relief valve incorporated therein, as shown in FIG. 2 and described below, to permit oil to flow around both the full flow filter element 28 and the bypass filter element 30 if those elements 28 and 30 are clogged or the system becomes overpressurized due to pressure regulator failure or cold temperature start up.

As illustrated in FIG. 1, the circumferential inner side or surface of the full flow filter element 28 is provided with a perforated support tube 50 composed of a suitably rigid plastic, metal, or metal alloy material. Similarly, as illustrated, the circumferential inner side or surface of the bypass filter element 30 is provided with a perforated support tube 52, again composed of a suitably rigid plastic, metal, or metal alloy material. The tubes 50 and 52 may be formed, for example, by joining ends of a sheet of support material together at an appropriate joint or seam after cutting the sheet to an appropriate length. One such joint or seam 54 is shown in FIG. 1.

Fluid flow paths represented in FIG. 1 will now be described. During engine operation, liquid enters the filter 10 through the openings 22, passes through the space delimited by the flange 44 between the underside of the end cap 34 and the annular end wall 18, and travels into an annular volume 60 defined between an outer circumferential side of the full flow filter element 28 and an inner circumferential side of the outer case side wall 14. A major portion of the liquid entering the filter 10 will pass through the full flow filter element 28 in a manner that is schematically represented by an arrow "A," and will thus be subjected to coarse filtering. However, a minor portion of the liquid entering the filter 10 will pass entirely through the annular volume 60, into a volume 62 defined between the end wall 16 and the top end cap 32, through an inlet to the inner bypass filter volume 35 that, as illustrated, is defined by the radially inner end cap flange 38, and into the inner bypass filter volume 35 in a manner that is schematically represented by an arrow "B." The cap 32 is kept spaced from the end wall 16 by a guide element or guide elements, or a spring, as will become apparent from the description of FIG. 2. Such a guide element or spring is not shown in FIG. 1.

The fraction of liquid entering the filter 10 that passes into the inner bypass filter volume will, of course, depend on a number of parameters, including the relative porosities of the full flow filter element 28 and the bypass filter element 30, although, as mentioned, commonly, about 10 percent of the liquid passes into the volume 35 in the manner described.

After entering the inner bypass filter volume 35, the fraction of liquid that does not pass through the full flow filter element 28 proceeds through the bypass filter element 30, in a manner that is schematically represented by an arrow "C," and is subjected to the fine filtering process provided by the bypass filter element. The liquid flow passing through the full flow filter element 28 and the liquid flow passing through the bypass filter element 30 both exit the liquid filter through the discharge opening 24 in the annular wall 18.

In the arrangement shown in FIG. 2, many features are the same as or similar to features described in connection with the configuration shown in FIG. 1, and an unnecessary, repetitive description of those features is not provided here. Any feature shown in FIG. 2 that is essentially the same as a corresponding feature shown in FIG. 1 is indicated by the same reference number used in FIG. 1 but with the letter "a" added. The arrangement shown in FIG. 2 includes a filter cartridge 26a having a full flow filter element 28a surrounding a bypass flow filter element 30a, a first, annular, top end cap 32a, a second, annular bottom end cap 34a, and a bypass filter end cap 33a. FIG. 2 shows the top end cap 32a as having guide elements 37a formed thereon or attached thereto. These guide elements 37a help to guide the filter cartridge 26a into the outer case 12a as the filter 10a is being assembled, and act to keep the cap 32a spaced from the end wall 16a after the filter is assembled, as mentioned in the description of FIG. 1. Inner and outer flanges 38a and 40a of the solid end cap wall 36a are also indicated in FIG. 2. In the arrangement shown in FIG. 2, the perforated support tube 52a is provided on the circumferential outer side of the bypass flow filter element 30a rather than on the circumferential inner side thereof.

The bottom assembly 20a of the arrangement shown in FIG. 2 includes an annular wall 18a having fluid inlet openings 22a circumferentially surrounding a discharge opening 24a. As with the configuration illustrated in FIG. 1, the second, annular bottom end cap 34a is formed by a solid wall 42a having both a radially inner flange 44a and a radially outer flange 46a extending from the wall 42a. An end 45a of the inner flange 44a is bent over radially inwardly so that it can rest on an axial end 70a of a tube 72a defining the discharge opening 24a. Abutment of the end 45a and the axial end 70a operates, similarly to abutment of the flange 44 and the wall 18 in the arrangement shown in FIG. 1, to assure that a clearance between the openings 22a and the wall 42a is maintained to permit the necessary fluid flow.

FIG. 2 also illustrates the seal structure surrounding the discharge opening 24a that cooperates with an adjacent part of a vehicle engine or engine fitting. The seal structure shown is composed of a gasket 80a and a retainer 82a that is rolled onto or otherwise secured to the side wall 14a of the outer case 12a. The gasket 80a may be of a suitable elastomeric material, while the retainer 82a may be of a suitable metallic or plastic material.

The end cap 33a is shown with a relief valve incorporated therein. As mentioned above, such a relief valve permits oil to flow around both the full flow filter element 28a and the bypass filter element 30a if those elements are clogged or the system becomes over-pressurized due to pressure regulator failure or cold temperature start up. The end cap 33a, in this configuration, defines a valve seat with a central opening therein, which is closable by a disc or plate, a piston, a ball, or some other appropriate valve element 90a. The valve, element 90a is biased by a spring 92a toward the valve seat and into a position in which it closes the central opening in the cap 33a. In this manner, the relief valve permits one-way fluid passage through the end cap 33a out of the inner bypass filter volume 35a, but precludes return flow from the full flow filter volume 96a back into the inner bypass filter volume 35a. In the arrangement shown, the spring 92a is retained in position relative to the end cap 33a by a retainer cage 94a mounted on the end cap 33a. Other relief valve configurations could be used if desired. In other respects, flow proceeds through the filter 10a shown in FIG. 2 in the same way as through the filter 10 shown in FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fluid filter comprising:
   an outer case including a side wall, a closed first end wall, and a second end wall defining fluid inlet openings and at least one fluid outlet opening; and
   a filter cartridge received within said outer case and including:
      a substantially cylindrical full flow filter element providing for passage of a major portion of fluid entering the filter;
      a substantially cylindrical bypass filter element providing for passage of a minor portion of fluid entering the filter that is disposed radially within and surrounded circumferentially by said full flow filter element;
      a first annular end cap including a first solid wall against which adjacent first ends of both the full flow filter element and the bypass filter element engage and are secured, the first annular end cap surrounding an inlet to an inner bypass filter volume;
      a second annular end cap including a second solid wall adapted to surround said at least one fluid outlet opening, a second end of the full flow filter element secured to said second solid wall;
      a bypass filter end cap, disposed at an intermediate location between the first and second annular end caps, to which a second end of the bypass filter element is secured; and
   a retainer disposed adjacent to the second end wall of the outer case, secured to the side wall of the outer case, and extending radially inwardly from the side wall of the outer case, the retainer mounting an elastomeric gasket between the second end wall of the outer case and an adjacent part of a vehicle engine or fitting;
   wherein fluid flow into said inner bypass filter volume occurs through a space defined between the closed first end wall of the outer case and the first annular end cap and through said inlet to the inner bypass filter volume surrounded by the first annular end cap;
   wherein fluid flow into the fluid filter occurs through the fluid inlet openings in the second end wall of the outer case and a space maintained by abutment between part of the second annular end cap and a part of the second end wall of the outer case;
   wherein the second annular end cap includes a radially outer flange depending from said second solid wall to facilitate positioning of the full flow filter element; and
   wherein part of the second annular end cap is defined by a bent over end of a radially inner flange depending from said second solid wall in the same direction as that in which said radially outer flange extends from said second solid wall, the bent over end being substantially parallel with said second solid wall and resting directly atop on an axial end of a tube defining the at least one fluid outlet opening of the outer case second end wall.

2. The fluid filter according to claim 1, wherein one way fluid flow is permitted through the bypass filter end cap for pressure relief.

3. The fluid filter according to claim 1, further comprising a perforated support tube located around a surface of at least one of said full flow and bypass filter elements.

4. The fluid filter according to claim 3, wherein said surface is a circumferential outer or inner surface.

5. The fluid filter according to claim 1, further comprising at least one element acting as a spacer between the first solid wall of the first annular end cap and the closed end wall of the outer case.

6. The fluid filter according to claim 5, wherein the spacer is formed by a plurality of elements depending from the first solid wall.

7. The fluid filter according to claim 5, wherein the spacer is formed as a part of the closed end wall of the outer case.

8. The fluid filter according to claim 5, wherein the first annular end cap includes radially inner and outer flanges depending from said first solid wall to facilitate positioning of the full flow and bypass filter elements.

9. The fluid filter according to claim 5, wherein one way fluid flow is permitted through the bypass filter end cap for pressure relief.

* * * * *